US012722287B2

(12) United States Patent
Liu et al.

(10) Patent No.: US 12,722,287 B2
(45) Date of Patent: Sep. 1, 2026

(54) DEXTEROUS HAND CONTROL METHOD, DEVICE, AGENT, AND STORAGE MEDIUM

(71) Applicant: HUMANOID ROBOT (SHANGHAI) CO., LTD., Shanghai (CN)

(72) Inventors: Yufei Liu, Shanghai (CN); Lei Jiang, Shanghai (CN); Yongyao Li, Shanghai (CN)

(73) Assignee: HUMANOID ROBOT (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 19/219,961

(22) Filed: May 27, 2025

(65) Prior Publication Data

US 2026/0208351 A1 Jul. 23, 2026

Related U.S. Application Data

(63) Continuation of application No. PCT/CN2025/097015, filed on May 23, 2025.

(30) Foreign Application Priority Data

Jan. 17, 2025 (CN) ......................... 202510073194.6

(51) Int. Cl.
*B25J 9/16* (2006.01)
*G06T 7/20* (2017.01)

(52) U.S. Cl.
CPC ............. *B25J 9/161* (2013.01); *B25J 9/1612* (2013.01); *G06T 7/20* (2013.01); (Continued)

(58) Field of Classification Search
CPC ........... B25J 9/161; B25J 9/1612; G06T 7/20; G06T 2207/10016; G06T 2207/20081; G06T 2207/30241
See application file for complete search history.

(56) References Cited

U.S. PATENT DOCUMENTS

2006/0071625 A1* 4/2006 Nakata .................. B25J 9/1633 318/568.12
2014/0188273 A1 7/2014 Khoukhi et al.
(Continued)

FOREIGN PATENT DOCUMENTS

CN 109940616 A 6/2019
CN 111844049 A 10/2020
(Continued)

OTHER PUBLICATIONS

Machine translation CN1148888011 NPL (Year: 2022).*
(Continued)

*Primary Examiner* — Mohamad O El Sayah

(57) ABSTRACT

Embodiments of the present disclosure provide a dexterous hand control method, device, agent, and storage medium. The method includes: acquiring sensor data; preprocessing the sensor data to obtain input information, where the input information includes environmental information and state information of a dexterous hand; inputting the input information into a cerebellar model to obtain a corresponding control instruction, where the cerebellar model includes a trajectory planning model and a motion controller, the trajectory planning model is used to output a corresponding trajectory planning result according to the input information, the motion controller is used to convert the trajectory planning result into the corresponding control instruction, and the motion controller is obtained by combining a cerebellar model neural network with a whole-body dynamics model based on a model predictive control algorithm; and performing a driving control on an actuator module of the dexterous hand according to the control instruction.

20 Claims, 10 Drawing Sheets

(52) U.S. Cl.
CPC ............... *G06T 2207/10016* (2013.01); *G06T 2207/20081* (2013.01); *G06T 2207/30241* (2013.01)

(56) References Cited

U.S. PATENT DOCUMENTS

| | | | | |
|---|---|---|---|---|
| 2019/0228495 | A1 | 7/2019 | Tremblay et al. | |
| 2021/0276187 | A1* | 9/2021 | Tang | B25J 9/161 |
| 2022/0233271 | A1* | 7/2022 | Peine | A61B 90/06 |
| 2023/0234233 | A1 | 7/2023 | Goyal et al. | |
| 2023/0294277 | A1* | 9/2023 | Yang | B25J 9/1605 700/217 |
| 2025/0269537 | A1* | 8/2025 | Ren | G06V 10/44 |

FOREIGN PATENT DOCUMENTS

| | | | | |
|---|---|---|---|---|
| CN | 111844047 | B | 6/2021 | |
| CN | 112060082 | B | 10/2021 | |
| CN | 114800490 | A | 7/2022 | |
| CN | 114888801 | A * | 8/2022 | B25J 9/1605 |
| CN | 115816456 | A | 3/2023 | |
| CN | 116309722 | A | 6/2023 | |
| CN | 116330290 | B | 8/2023 | |
| CN | 116572237 | A | 8/2023 | |
| CN | 117733850 | A | 3/2024 | |
| CN | 117984327 | A | 5/2024 | |
| CN | 118238142 | A | 6/2024 | |
| CN | 118927246 | A | 11/2024 | |
| CN | 119458388 | A | 2/2025 | |

OTHER PUBLICATIONS

The First Office Action dated Feb. 22, 2025 for Application No. 202510073194.6.
Notification to Grant Patent Right for Invention dated Mar. 13, 2025 for Application No. 202510073194.6.
International Search Report for International Patent Application No. PCT/CN2025/097015, dated Oct. 8, 2025.

* cited by examiner

110

1102
1101
1108
Memory
1103
1109
Processor
Communication component
Power component
Processing component
1104
1107
Multimedia component
Sensor component
1105
Audio component
1106
Input/ output interface

DEXTEROUS HAND CONTROL METHOD, DEVICE, AGENT, AND STORAGE MEDIUM

This application is a continuation of International Application No. PCT/CN2025/097015, filed on May 23, 2025, which claims priority to Chinese Patent Application No. 202510073194.6, titled "DEXTEROUS HAND CONTROL METHOD, DEVICE, AGENT, AND STORAGE MEDIUM", filed on Jan. 17, 2025. The disclosures of the aforementioned applications are hereby incorporated by reference in their entireties.

TECHNICAL FIELD

Embodiments of the present disclosure relate to a technical field of a dexterous hand of a humanoid robot and, in particular, relate to a dexterous hand control method, device, agent, and storage medium.

BACKGROUND

With the rapid advancement of science and technology, a robot technology is developing at an unprecedented speed, and a dexterous hand, as an outstanding representative in this field, has remarkable complex and precise operational capabilities. However, this high degree of freedom also brings unprecedented control challenges, especially in task scenarios that require rapid response and high coordination. The traditional control strategies, although performing well in certain scenarios, are often limited by complex mathematical models and fixed algorithm frameworks, making it difficult to flexibly adapt to changing operating environments.

In related arts, the traditional control strategies, for example, a proportional integral derivative (PID) control, a classical adaptive control, an open-loop control, etc., may be used to control the dexterous hand.

However, in the process of implementing the present disclosure, the inventor found that there are at least the following problems in the prior art: for the dexterous hand with a high degree of freedom, the above manner lacks accuracy and flexibility in the task scenarios where rapid response and high coordination are applied.

SUMMARY

The present disclosure provides a dexterous hand control method, device, agent, and storage medium, to improve accuracy and flexibility of a dexterous hand control.

In a first aspect, the present disclosure provides a dexterous hand control method, including:

acquiring sensor data;

preprocessing the sensor data to obtain input information, where the input information includes environmental information and state information of a dexterous hand;

inputting the input information into a cerebellar model to obtain a corresponding control instruction, where the cerebellar model includes a trajectory planning model and a motion controller, the trajectory planning model is used to output a corresponding trajectory planning result according to the input information, the motion controller is used to convert the trajectory planning result into the corresponding control instruction, and the motion controller is obtained by combining a cerebellar model neural network with a whole-body dynamics model based on a model predictive control algorithm; and performing a driving control on an actuator module of the dexterous hand according to the control instruction.

In a possible design, the environmental information includes at least one of following parameters of an object in a real environment where the dexterous hand is located: a position, a shape, or a size; and the state information includes at least one of following parameters: positions, forces, velocities, or accelerations of fingers of the dexterous hand.

In a possible design, before inputting the input information into the cerebellar model to obtain the corresponding control instruction, the method further includes:

constructing a physical model according to a physical structure of the dexterous hand and a physical structure of a robotic arm;

constructing a cerebellar to-be-trained neural network and a trajectory planning to-be-trained model;

acquiring a training sample set;

training, based on the training sample set and the physical model, the cerebellar to-be-trained neural network and the trajectory planning to-be-trained model to obtain the cerebellar model neural network and the trajectory planning model; and combining, based on the model predictive control algorithm, the cerebellar model neural network with the whole-body dynamics model to obtain the motion controller, and determining the cerebellar model according to the motion controller and the trajectory planning model.

In a possible design, combining, based on the model predictive control algorithm, the cerebellar model neural network with the whole-body dynamics model to obtain the motion controller includes:

connecting an inverse kinematics module with an inverse dynamics module in series, and then connecting with the cerebellar model neural network in parallel to obtain the motion controller, where the inverse dynamics module is further used to be connected with a forward dynamics module and a forward kinematics module in series sequentially, the forward dynamics module is used to provide a feedback output to the inverse dynamics module, and the forward kinematics module is used to provide a feedback output to the inverse kinematics module and the cerebellar model neural network.

In a possible design, combining, based on the model predictive control algorithm, the cerebellar model neural network with the whole-body dynamics model to obtain the motion controller includes:

connecting the cerebellar model neural network with the forward dynamic module and forward kinematics module in series sequentially to obtain the motion controller, where the forward kinematics module is used to provide a feedback output to the cerebellar model neural network.

In a possible design, a backbone network of the trajectory planning to-be-trained model includes a convolutional neural network and an attention network, where the convolutional neural network is a residual network, the attention network includes a self-attention network with a first preset number of layers and a cross-attention network with a second preset number of layers, the first preset number of layers is greater than or equal to 4, and the second preset number of layers is greater than or equal to 7.

In a possible design, acquiring the training sample set includes:

controlling the dexterous hand and a robotic arm to perform grasping and operation task in multiple scenarios through a remote operating system, and collecting sensor data in a process of task execution, where task objects or operating environments are different in different scenarios, and different task objects refer that at least one of following parameters of the task objects are different: a shape, a material, or a position; and preprocessing the sensor data to obtain the training sample set.

In a possible design, the training sample set includes multiple groups of image sequences and corresponding expected trajectories, as well as multiple groups of trajectories and corresponding expected torques; and training, based on the training sample set and the physical model, the cerebellar to-be-trained neural network and the trajectory planning to-be-trained model to obtain the cerebellar model neural network and the trajectory planning model includes:

training, based on a first loss function and a backpropagation algorithm, the cerebellar to-be-trained neural network according to the multiple groups of trajectories and the corresponding expected torques to obtain the cerebellar model neural network, where the first loss function includes an error between an actual torque output by the cerebellar to-be-trained neural network and an expected torque; and training, based on a second loss function and a backpropagation algorithm, the trajectory planning to-be-trained model according to the multiple groups of image sequences and the corresponding expected trajectories to obtain the trajectory planning model, where the second loss function includes an error between an actual trajectory output by the trajectory planning to-be-trained model and an expected trajectory.

In a possible design, the training sample set includes multiple groups of trajectories and corresponding expected torques, as well as multiple groups of image sequences and corresponding expected torques; and training, based on the training sample set and the physical model, the cerebellar to-be-trained neural network and the trajectory planning to-be-trained model to obtain the cerebellar model neural network and the trajectory planning model includes:

training, based on a first loss function and a backpropagation algorithm, the cerebellar to-be-trained neural network according to the multiple groups of trajectories and the corresponding expected torques to obtain an initial cerebellar model neural network, where the first loss function includes an error between an actual torque output by the cerebellar to-be-trained neural network and an expected torque; and jointly training, based on a second loss function and a backpropagation algorithm, the trajectory planning to-be-trained model and the initial cerebellar model neural network according to the multiple groups of image sequences and the corresponding expected trajectories to obtain the trajectory planning model and the cerebellar model neural network, where the second loss function includes an error between an actual trajectory output by the trajectory planning to-be-trained model and an expected trajectory.

In a second aspect, the present disclosure provides a dexterous hand control device, including:

an acquiring module, configured to acquire sensor data;

a determining module, configured to preprocess the sensor data to obtain input information, where the input information includes environmental information and state information of a dexterous hand;

a processing module, configured to input the input information into a cerebellar model to obtain a corresponding control instruction, where the cerebellar model includes a trajectory planning model and a motion controller, the trajectory planning model is used to output a corresponding trajectory planning result according to the input information, the motion controller is used to convert the trajectory planning result into the corresponding control instruction, and the motion controller is obtained by combining a cerebellar model neural network with a whole-body dynamics model based on a model predictive control algorithm; and a driving control module, configured to perform a driving control on an actuator module of the dexterous hand according to the control instruction.

In a third aspect, the present disclosure provides a dexterous hand control device, including: at least one processor and a memory;

the memory stores computer execution instructions; and the at least one processor executes computer execution instructions stored in the memory to cause the at least one processor to execute the method described in the first aspect and various possible designs of the first aspect.

In a fourth aspect, the present disclosure provides a computer readable storage medium, having computer execution instructions stored thereon, when a processor executes the computer execution instructions, the method described in the first aspect and various possible designs of the first aspect are implemented.

In a fifth aspect, the present disclosure provides a computer program product, including computer programs, when the computer programs are executed by a processor, the method described in the first aspect and various possible designs of the first aspect are implemented.

The present disclosure provides a dexterous hand control method, device, agent, and storage medium. The method includes: acquiring sensor data; preprocessing the sensor data to obtain input information, where the input information includes environmental information and state information of a dexterous hand; inputting the input information into a cerebellar model to obtain a corresponding control instruction, where the cerebellar model includes a trajectory planning model and a motion controller, the trajectory planning model is used to output a corresponding trajectory planning result according to the input information, the motion controller is used to convert the trajectory planning result into the corresponding control instruction, and the motion controller is obtained by combining a cerebellar model neural network with a whole-body dynamics model based on a model predictive control algorithm; and performing a driving control on an actuator module of the dexterous hand according to the control instruction.

The dexterous hand control method provided in the present disclosure, by introducing the cerebellar mechanism and combining the cerebellar model neural network with the whole-body dynamics model for model predictive control, can improve flexibility and accuracy of control, enabling the dexterous hand to perform various complex tasks more accurately, helping the dexterous hand quickly adapt to different operating environments and task requirements, reducing dependence on an accurate mathematical model, and thus simplifying a design and an implementation of a control system.

BRIEF DESCRIPTION OF THE DRAWINGS

The accompanying drawings here are incorporated into the specification and constitute a part of the specification, showing embodiments that comply with the present disclosure, and are used to explain the principle of the present disclosure together with the specification.

Figure 1:
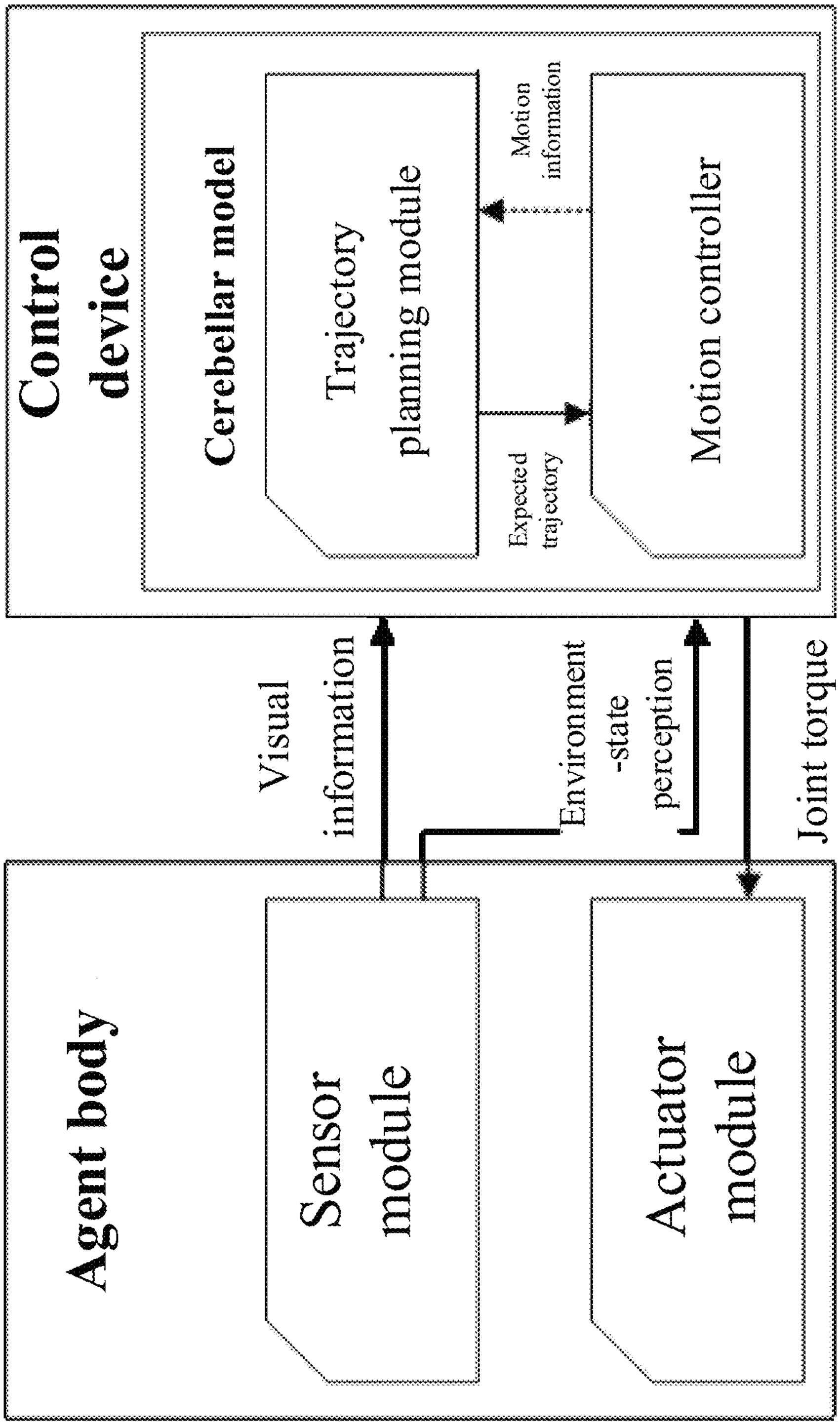
FIG. 1 is a schematic diagram of a scenario of a dexterous hand control method provided by an embodiment of the present disclosure.

Through the above drawings, specific embodiments of the present disclosure have been shown, and more detailed descriptions will be provided in the following. These drawings and textual descriptions are not intended to limit the scope of the concept of the present disclosure in any way, but rather to illustrate the concept of the present disclosure for those skilled in the art by referring to specific embodiments.

DETAILED DESCRIPTION OF THE EMBODIMENTS

To make the purposes, technical solutions and advantages of embodiments of the present disclosure more clearly, the technical solutions in the embodiments of the present disclosure are clearly and completely described in the following with reference to the accompanying drawings of the embodiments of the present disclosure. Obviously, the described embodiments are part of embodiments of the present disclosure, not all embodiments. Based on the embodiments of the present disclosure, all other embodiments obtained by those skilled in the art without creative labor are all within the protection scope of the present disclosure.

It should be noted that a dexterous hand control method provided in the present disclosure may be used in the technical field of the humanoid robot, and may also be used in any fields other than the technical field of the humanoid robot. The application field of the dexterous hand control method provided in the present disclosure is not limited.

With the rapid advancement of science and technology, a robot technology is developing at an unprecedented speed, and a dexterous hand with a high degree of freedom, as an outstanding representative in this field, has remarkable complex and precise operational capabilities. However, this high degree of freedom also brings unprecedented control challenges, especially in task scenarios that require rapid response and high coordination. The traditional control strategies, although performing well in certain scenarios, are often limited by complex mathematical models and fixed algorithm frameworks, making it difficult to flexibly adapt to changing operating environments.

In order to solve the above technical problems, the inventors of the present disclosure have found that a cerebellum, as a key part of the living organism responsible for motion coordination, exhibits excellent learning and adaptive abilities. The cerebellum can adjust a motion strategy in a short period of time to accurately adapt to changes in the external environment. Therefore, a learning mechanism of the cerebellum may be integrated into the field of robot control, especially in the control of the dexterous hand with the high degree of freedom. For the control of the dexterous hand with the high degree of freedom, the cerebellar learning mechanism may be introduced to bring advantages in multiple aspects. Firstly, the cerebellar learning mechanism can improve the flexibility and accuracy of control, so that the dexterous hand can perform various complex tasks more accurately. Secondly, since the cerebellar learning mechanism has a strong adaptive ability, it may help the dexterous hand quickly adapt to different operating environments and task requirements. Finally, this control strategy has a potential to reduce dependence on a precise mathematical model, thereby simplifying a design and an implementation of a control system. In addition, to ensure accuracy, a cerebellar model neural network may be combined with a whole-body dynamics model for model predictive control (MPC), which further improves control accuracy. Based on this, embodiments of the present disclosure provide a dexterous hand control method.

FIG. 1 is a schematic diagram of a scenario of a dexterous hand control method provided by an embodiment of the present disclosure. As shown in FIG. 1, a dexterous hand control system includes an agent body and a cerebellar model. The agent body may include a sensor module and an actuator module, and the cerebellar model may include a trajectory planning model and a motion controller.

In a specific implementation process, the sensor module collects sensor data, controls a device to obtain the sensor data, preprocesses the sensor data to obtain input information, where the input information includes environmental information and state information of the dexterous hand, and inputs the input information into the cerebellar model to obtain a corresponding control instruction. In a process of processing the input information by the cerebellar model, the trajectory planning model outputs a corresponding trajectory planning result according to the input information, and the motion controller converts the trajectory planning result into the corresponding control instruction, where the motion controller is obtained by combining the cerebellar model neural network with the whole-body dynamics model based on a model predictive control algorithm. The control device outputs the control instruction (including joint torques of the dexterous hand and a robotic arm) to the actuator module, which drives the dexterous hand and the robotic arm according to the control instruction to complete a task, for example, grasping, etc. The dexterous hand control method provided in the embodiment of the present disclosure, by introducing the cerebellar mechanism and combining the cerebellar model neural network with the whole-body dynamics model for model predictive control, can improve flexibility and accuracy of control, enabling the dexterous hand to perform various complex tasks more accurately, helping the dexterous hand quickly adapt to different operating environments and task requirements, reducing dependence on an accurate mathematical model, and thus simplifying a design and an implementation of a control system.

It should be noted that the schematic diagram of the scenario shown in FIG. 1 is only an example. The dexterous hand control method and scenario described in the embodiment of the present disclosure are intended to more clearly illustrate the technical solution of the embodiment of the present disclosure, and do not constitute a limitation on the technical solution provided by an embodiment of the present disclosure. Those of ordinary skill in the art know that, with an evolution of a system and an emergence of a new business scenario, for similar technical problems, the technical solution provided in the embodiment of the present disclosure is also applicable.

The technical solution of the present disclosure is illustrated in detail through specific embodiments in the following. The following specific embodiments may be combined with each other, and the same or similar concepts or processes may not be repeated in some embodiments.

Figure 2:
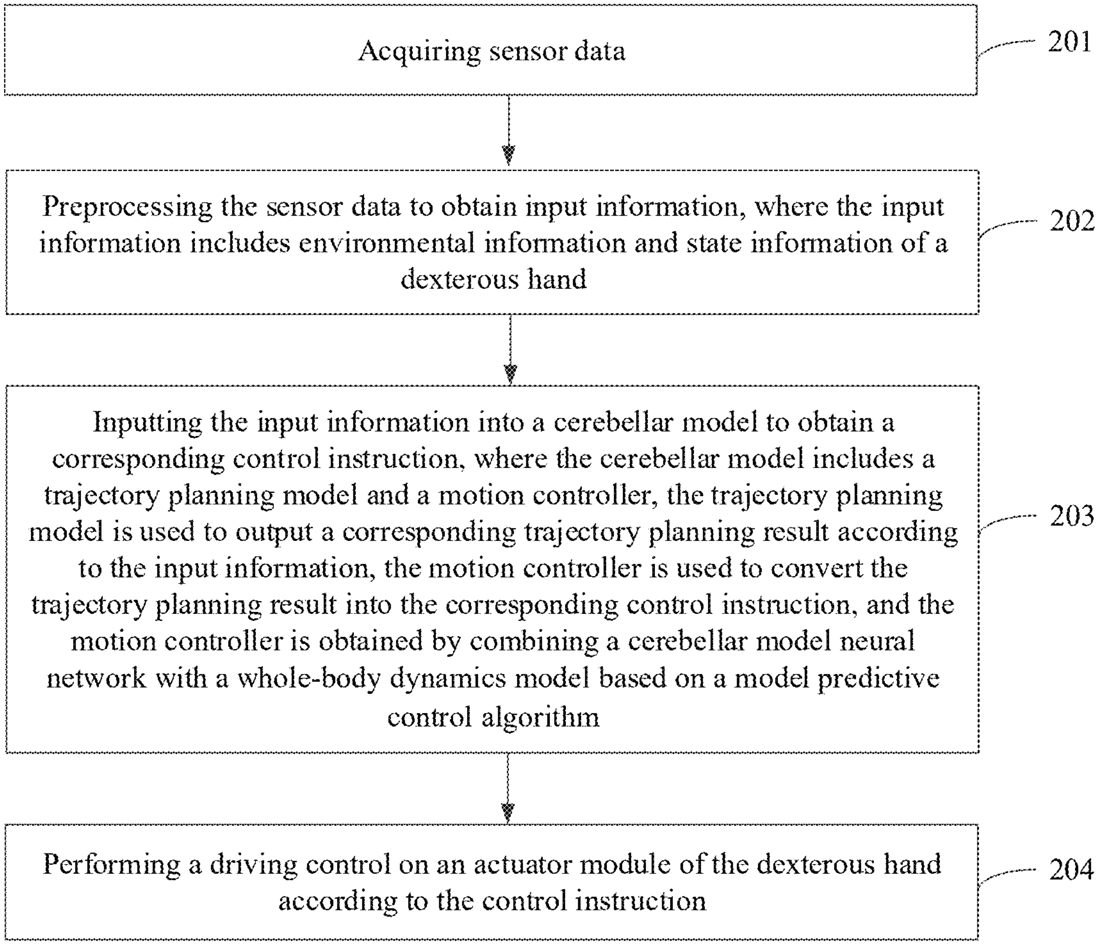
FIG. 2 is a flow schematic diagram of a dexterous hand control method provided by an embodiment of the present disclosure.

FIG. 2 a flow schematic diagram of a dexterous hand control method provided by an embodiment of the present disclosure. As shown in FIG. 2, the method includes the following.

S201, acquiring sensor data.

The executive entity of this embodiment may be an agent, for example, a humanoid robot, etc.

In this embodiment, the sensor data may include environmental information (for example, a position, a shape, and a size of an object) and other key data (for example, positions, forces, and velocities, etc., of fingers) that are collected through sensors, for example, a position sensor, a visual sensor, a force sensor, and a speed sensor, etc.

S202, preprocessing the sensor data to obtain input information, where the input information includes environmental information and state information of the dexterous hand.

Specifically, after the sensor data is obtained, at least one preprocessing step, for example, filtering, denoising, normalization, data cleaning, or data segmentation, etc., may be performed on the sensor data to obtain the input information.

Exemplary, in a process of filtering, different types of filters, for example, a low-pass filter, a high pass filter, and a band-pass filter, etc., may be selected according to data characteristics and requirements to remove high-frequency noise and interference from the data. In a process of denoising, methods, for example, mean filtering, median filtering, and Kalman filtering, etc., may be adopted to perform the denoise process to reduce noise and outliers in the data. In a process of normalization, methods, for example, linear normalization and nonlinear normalization, etc., may be adopted to convert data into values within a specific range (such as 0 to 1 or −1 to 1) for subsequent analysis and processing. In a process of data cleaning, duplicate data may be removed, missing data may be processed, and erroneous data may be corrected, where the duplicate data may be identified by comparing data values and timestamps and may be deleted. The missing data may be filled in through interpolation, regression, and other methods, the erroneous data may be corrected by setting thresholds or using other methods. In a process of data segmentation, data segmentation may be performed according to conditions, for example, a timestamp, a task type, and an object type, etc., for more detailed analysis and processing.

In some embodiments, the environmental information includes at least one of following parameters of an object in a real environment where the dexterous hand is located: a position, a shape, or a size; and the state information includes at least one of following parameters: positions, forces, velocities, or accelerations of fingers of the dexterous hand.

S203, inputting the input information into a cerebellar model to obtain a corresponding control instruction, where the cerebellar model includes a trajectory planning model and a motion controller, the trajectory planning model is used to output a corresponding trajectory planning result according to the input information, the motion controller is used to convert the trajectory planning result into the corresponding control instruction, and the motion controller is obtained by combining a cerebellar model neural network with a whole-body dynamics model based on a model predictive control algorithm.

Specifically, in a trained cerebellar model, the environmental information and the state information of the dexterous hand extracted from the sensor data are input. The trajectory planning model outputs the corresponding trajectory planning result according to the input information, and the motion controller converts the trajectory planning result into the control instruction through adaptive linear mapping.

S204, performing a driving control on an actuator module of the dexterous hand according to the control instruction.

Specifically, after the control instruction is obtained, the control instruction is sent to the actuator module of the dexterous hand to drive the dexterous hand to complete tasks, for example, grasping and operation, etc. During this process, a motion planning and coordination, including planning motion trajectories of the dexterous hand, coordinating actions of fingers, etc., are performed to ensure that the dexterous hand can complete tasks in accordance with a predetermined path and action. A real-time feedback and an online adjustment mechanism are used to continuously optimize the control strategy to adapt to changes in different environments and task requirements.

The dexterous hand control method provided in this embodiment, by introducing a cerebellar mechanism and combining the cerebellar model neural network with the whole-body dynamics model for the model predictive control, can improve flexibility and accuracy of control, enabling the dexterous hand to perform various complex tasks more accurately, helping the dexterous hand quickly adapt to different operating environments and task requirements, reducing dependence on an accurate mathematical model, and thus simplifying a design and an implementation of a control system.

Figure 3:
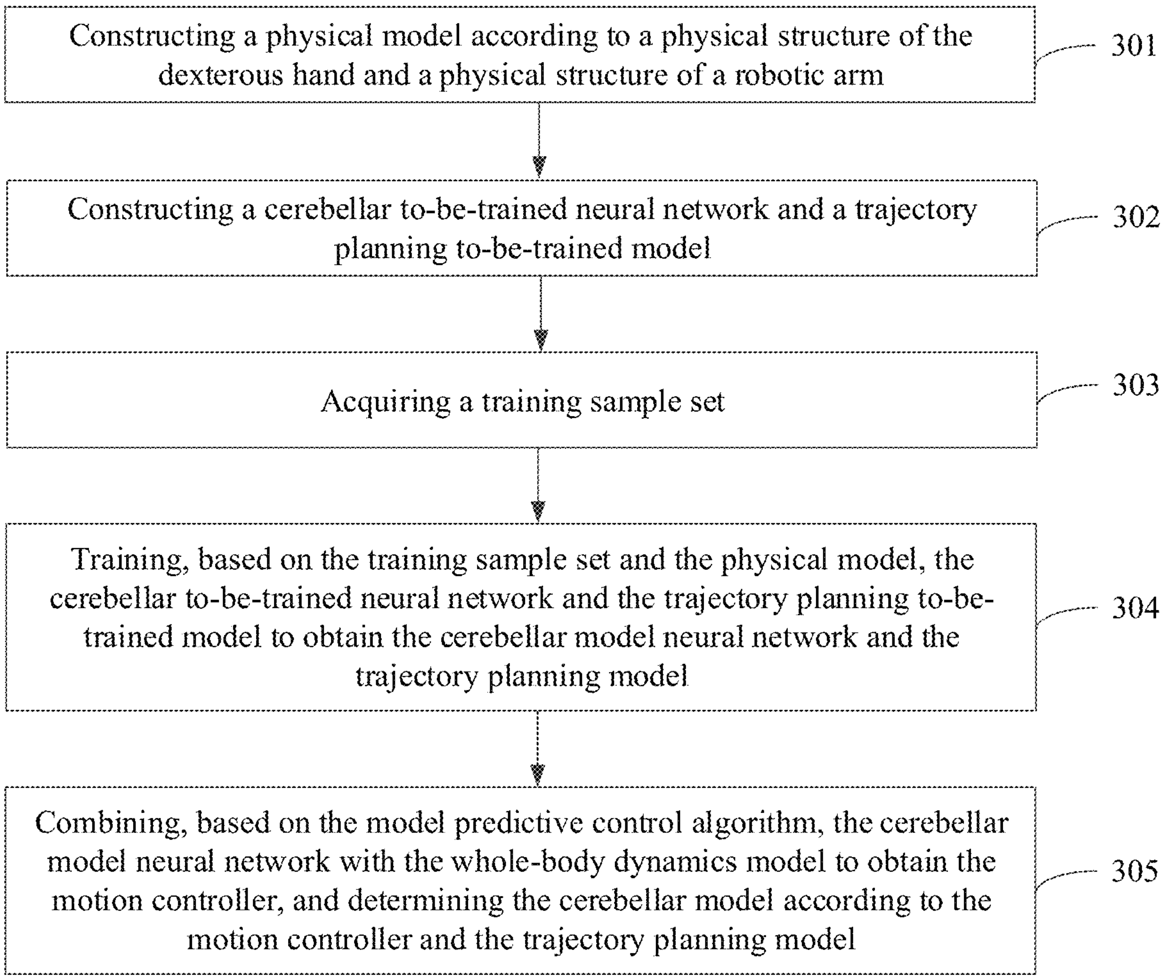
FIG. 3 is a flow schematic diagram of a training method for a cerebellar model provided by an embodiment of the present disclosure.

FIG. 3 is a flow schematic diagram of a training method for a cerebellar model provided by an embodiment of the present disclosure. As shown in FIG. 3, the method includes the following.

S301, constructing a physical model according to a physical structure of the dexterous hand and a physical structure of a robotic arm.

Specifically, a three-dimensional model is constructed as the physical model according to an actual physical structure of the dexterous hand and an actual physical structure of the robotic arm, where the physical model may include geometric dimensions and physical properties of fingers, joints, driving mechanisms, etc. A kinematic model and a dynamic model for the dexterous hand and the robotic arm are established by using kinematic equations and dynamic equations. These models describe principles of motion and force situations of the dexterous hand in different postures.

Exemplary, a kinematic model based on Danavit-Hartenberg (D-H) may be constructed, where a forward kinematics formula for the robotic arm and the dexterous hand may be:

$$J_{pose} = F_k(J_{angle}) \tag{1}$$

where $J_{angle}$ is an input joint angle, and $J_{pose}$ is an output pose of the robotic arm and the dexterous hand.

A inverse kinematics formula for the robotic arm and the dexterous hand is:

$$J_{angle} = f_k(J_{pose}) \tag{2}$$

where $J_{angle}$ is an output joint angle, $J_{pose}$ is an input pose of the robotic arm and the dexterous hand.

A dynamic model based on Lagrangian may be constructed, where a forward dynamic model of the robotic arm and the dexterous hand is:

$$J_{angle} = F_d(J_\tau) \tag{3}$$

where $J_\tau$ is an input driving torque, $J_{angle}$ is an output joint angle of the robotic arm and the dexterous hand.

An inverse dynamic model of the robotic arm and the dexterous hand is:

$$J_\tau = f_d(J_{angle}) \tag{4}$$

where $J_\tau$ is an output driving torque, $J_{angle}$ is an input joint angle of the robotic arm and the dexterous hand.

S302, constructing a cerebellar to-be-trained neural network and a trajectory planning to-be-trained model.

Specifically, the trajectory planning to-be-trained model adopts an imitation learning method to extract a trajectory feature from operation data of human or other dexterous hands, and, based on deep learning techniques (such as a convolutional neural network (CNN) and a sequence model Transformer based on attention), the trajectory is encoded and decoded to generate trajectories suitable for different tasks. The CNN may be used to extract spatial features of trajectories, and Transformer can capture temporal dependencies of trajectories.

In some embodiments, a backbone network of the trajectory planning to-be-trained model includes a convolutional neural network and an attention network, where the convolutional neural network is a residual network, the attention network includes a self-attention network with a first preset number of layers and a cross-attention network with a second preset number of layers, the first preset number of layers is greater than or equal to 4, and the second preset number of layers is greater than or equal to 7. A trajectory planning system combines advantages of CNN and Transformer, which effectively extracts information from an image sequence and predicts a future trajectory of the robotic arm and the dexterous hand. The system has good scalability and flexibility, and may be adjusted and optimized according to specific application scenarios.

Specifically, an input of the trajectory planning to-be-trained model includes the image sequence (visual information collected through a visual sensor) and a corresponding position of the robotic arm and the dexterous hand (state information collected through a position sensor, etc.), as well as a random variable. An output of the trajectory planning to-be-trained model includes a predicted trajectory sequence and a random variable.

Figure 4:
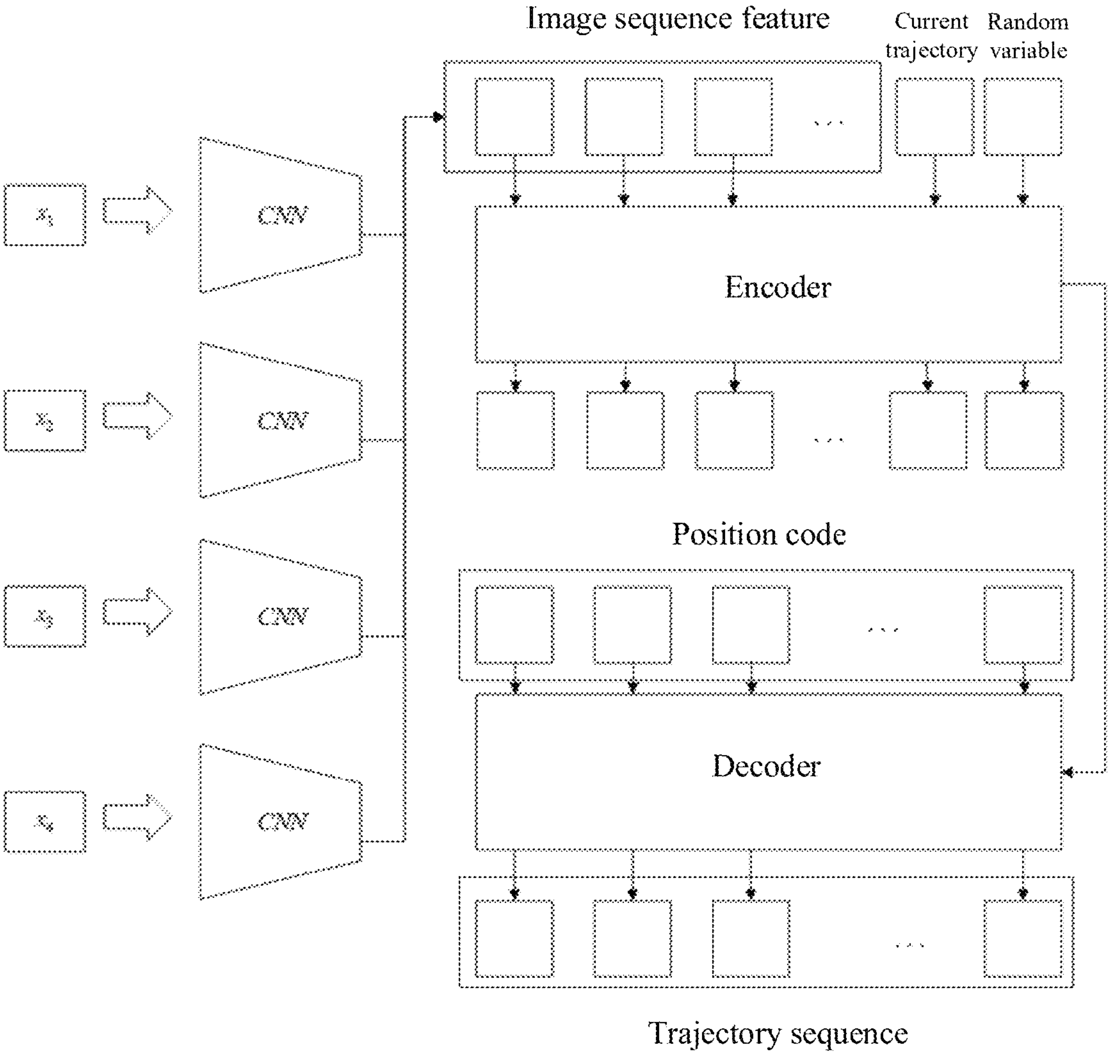
FIG. 4 is a schematic structural diagram of a trajectory planning to-be-trained model provided by an embodiment of the present disclosure.

Exemplary, as shown in FIG. 4, an input of the trajectory planning system may be defined as an image sequence $X=\{x_1, x_2, \ldots, x_n\}$, where $x_n$ is an $n^{th}$ image, n is a positive integer greater than 1, and $i^{th}$ image information $x_i \in R^{w \times h \times d}$, w, h, d represents width, height, and depth of the image (for example, sizes may be 3, 480, 630, respectively). An output of the trajectory planning system may be defined as trajectory sequence information $T=\{t_1, t_2, \ldots, t_n\}$, where $t_n$ is an $n^{th}$ trajectory, and n is a positive integer greater than 1. Each trajectory includes an end pose of the robotic arm (e.g. 7 dimensions) and a bending angle of the dexterous hand (e.g. 15 dimensions). The trajectory planning system may adopt a mobile imitation learning operation task algorithm (Mobile ALHOA algorithm), the backbone network consists of CNN and Transformer, CNN adopts ResNet18, Transformer encoder Encoder adopts a 4-layer self-attention network, and Transformer decoder Decoder adopts a 7-layer cross-attention network.

The cerebellar to-be-trained neural network may include an input layer, an intermediate layer (such as a cerebellar cortex simulation layer), and an output layer. The intermediate layer may include multiple cerebellar units, each cerebellar unit performs a nonlinear processing on an input through a sparse connection and a local generalization capability.

Figure 5:
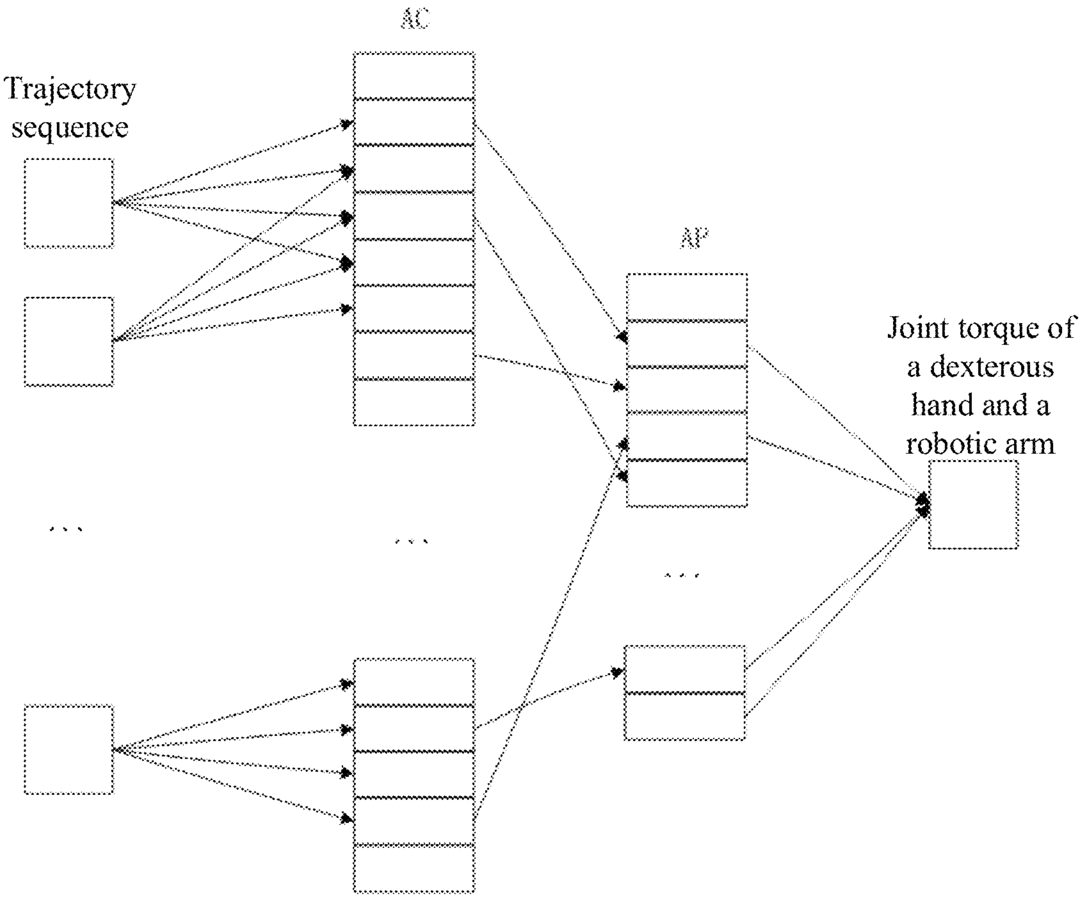
FIG. 5 is a schematic structural diagram of a cerebellar model to-be-trained neural network provided by an embodiment of the present disclosure.

Exemplary, as shown in FIG. 5, the input of the cerebellar to-be-trained neural network is trajectory information, and an output is joint torque and other information. The cerebellar to-be-trained neural network includes a virtual associative space (AC) and a physical storage space (AP). Through conceptual mapping and actual mapping of these two spaces, nonlinear mapping is achieved based on local approximation and an association function. The virtual associative space (AC) is mapping of an input space used to store information after a quantization encoding of an input state. After the quantization encoding, an input vector is mapped to multiple storage units in AC. There are partial overlaps between these storage units, and similar inputs will excite more overlapping units in AC. The physical storage space (AP) stores a weight value of network training. Each storage unit in AC corresponds to one weight value in AP. The output of the network is a sum of weight values of all excited storage units in the AP. Compared to a traditional control algorithm, a control algorithm based on the cerebellar model has faster efficiency and accuracy.

S303, acquiring a training sample set.

Specifically, a remote operating system may be used to control the dexterous hand and the robotic arm to perform grasping and operation task in different scenarios (such as objects of different shapes, materials, postures, and different operating environments). Environmental information (such as a position, a shape, and a size of an object), a finger position, a force, a speed, and other sensor data are collected in real time. The collected data (for example, filtering, denoising, and normalization, etc.) is preprocessed to improve data quality and usability.

In some embodiments, in order to ensure authenticity and richness of training data to improve training accuracy, data specially collected from different scenarios may be used as a training sample. Specifically, acquiring the training sample set may include: controlling the dexterous hand and a robotic arm to perform grasping and operation task in multiple scenarios through a remote operating system, and collecting sensor data in a process of task execution, where task objects or operating environments are different in different scenarios, and different task objects refer that at least one of following parameters of the task objects are different: a shape, a material, or a position; and preprocessing the sensor data to obtain the training sample set.

S304, training, based on the training sample set and the physical model, the cerebellar to-be-trained neural network and the trajectory planning to-be-trained model to obtain the cerebellar model neural network and the trajectory planning model.

Specifically, in a process of training, the sensor data collected through the remote operating system may be input into the trajectory planning to-be-trained model, and CNN and Transformer of the model may be used to generate a predicted trajectory feature. Then, the generated predicted trajectory feature is used as an input, combined with the environmental information and the state information of the dexterous hand, and input into a motion controller model. The motion controller model (the cerebellar to-be-trained neural network, the whole-body dynamics model, and the model predictive control) outputs corresponding control instruction(s) according to input information, these instructions are converted into signals that can be understood by the actuator of the dexterous hand through adaptive linear mapping. After the corresponding control instructions are obtained, an error between an actual result obtained based on the physical model (for example, the motion trajectory and the force, etc., of the dexterous hand) and an expected result is used as a loss function, and a weight of the model is updated through a backpropagation algorithm. According to convergence situation and performance of the algorithm, the model is optimized and adjusted, including adjusting a learning rate, increasing a number of iterations, modifying a network structure (for example, increasing or decreasing a number of cerebellar units, changing a connection mode, etc.).

In some embodiments, in order to improve training efficiency, the cerebellar to-be-trained neural network and the trajectory planning to-be-trained model may be trained respectively. Specifically, the training sample set includes multiple groups of image sequences and corresponding expected trajectories, as well as multiple groups of trajectories and corresponding expected torques; and training, based on the training sample set and the physical model, the cerebellar to-be-trained neural network and the trajectory planning to-be-trained model to obtain the cerebellar model neural network and the trajectory planning model includes: training, based on a first loss function and a backpropagation algorithm, the cerebellar to-be-trained neural network according to the multiple groups of trajectories and the corresponding expected torques to obtain the cerebellar model neural network, where the first loss function includes an error between an actual torque output by the cerebellar to-be-trained neural network and an expected torque; and training, based on a second loss function and a backpropagation algorithm, the trajectory planning to-be-trained model according to the multiple groups of image sequences and the corresponding expected trajectories to obtain the trajectory planning model, where the second loss function includes an error between an actual trajectory output by the trajectory planning to-be-trained model and an expected trajectory.

Exemplary, simulation environment joint contact dynamics (MuJoCo) may be used for training. A 12G RTX 3080 graphics processing unit (GPU) may be used for model training. Smooth L1 loss function (Huber loss function) and adaptive moment estimation (Adam) W optimizer may be adopted. An expression for the loss function is as follows:

$$\text{Loss} = \begin{cases} \|T_{pred} - T_{true}\| - 0.5, & \|T_{pred} - T_{true}\| >= 1 \\ 0.5 \times \|T_{pred} - T_{true}\|^2, & \|T_{pred} - T_{true}\| < 1 \end{cases} \quad (5)$$

where, Loss is the loss function, $T_{pred}$ is a predicted value of the model, for example, the expected torque or the expected trajectory, $T_{true}$ is a true value, for example, the actual torque or the actual trajectory.

In a process of training, the trajectory planning to-be-trained model may be trained firstly for 100 cycles, with 32 groups of image sequences and corresponding trajectories input for each batch, and then the cerebellar to-be-trained neural network may be trained, with 128 trajectories and corresponding torques input for each batch. In each training iteration, state-action-reward sequences are generate from a MuJoCo environment. These sequences are used to update corresponding models. The loss is calculated based on the corresponding loss function, and the AdamW optimizer is used to update the weight of the model. The performance of the model is checked regularly, and hyperparameters, for example, the learning rate and weight decay, etc., are adjusted as necessary.

In some embodiments, in order to improve training accuracy while ensuring training efficiency, the cerebellar model may be initially trained firstly, and then an initial cerebellar model neural network and the trajectory planning to-be-trained model may be jointly trained after the initial training. Specifically, the training sample set includes multiple groups of trajectories and corresponding expected torques, as well as multiple groups of image sequences and corresponding expected torques; and training, based on the training sample set and the physical model, the cerebellar to-be-trained neural network and the trajectory planning to-be-trained model to obtain the cerebellar model neural network and the trajectory planning model includes: training, based on a first loss function and a backpropagation algorithm, the cerebellar to-be-trained neural network according to the multiple groups of trajectories and the corresponding expected torques to obtain an initial cerebellar model neural network, where the first loss function includes an error between an actual torque output by the cerebellar to-be-trained neural network and an expected torque; and jointly training, based on a second loss function and a backpropagation algorithm, the trajectory planning to-be-trained model and the initial cerebellar model neural network according to the multiple groups of image sequences and the corresponding expected trajectories to obtain the trajectory planning model and the cerebellar model neural network, where the second loss function includes an error between an actual trajectory output by the trajectory planning to-be-trained model and an expected trajectory.

Exemplary, the simulation environment MuJoCo may be used for training. The 12G RTX 3080 GPU may be used for model training. The Smooth L1 loss function (Huber loss function, the loss function as shown in expression (5)) and the AdamW optimizer may be used.

In a process of training, the cerebellar to-be-trained neural network may be trained firstly, with 128 trajectories and corresponding torques input for each batch. In each training iteration, the state-action-reward sequences are generate from the MuJoCo environment. The loss is calculated based on the corresponding loss function, and the AdamW optimizer is used to update the weight of the model. The performance of the model is checked regularly, and hyperparameters, for example, the learning rate and the weight decay, etc., are adjusted as necessary. Then, the trajectory planning to-be-trained model and the cerebellar to-be-trained neural network are jointly trained for 100 cycles, with 32 groups of image sequences and corresponding torques input for each batch. In each training iteration, the state-action-reward sequences are generate from the MuJoCo environment. The loss is calculated based on the corresponding loss function, and the AdamW optimizer is used to update the weight of the model. The performance of the model is checked regularly, and hyperparameters, for example, the learning rate and the weight decay, etc., are adjusted as necessary.

S305, combining, based on the model predictive control algorithm, the cerebellar model neural network with the whole-body dynamics model to obtain the motion controller, and determining the cerebellar model according to the motion controller and the trajectory planning model.

Specifically, in order to further improve accuracy, the cerebellar model neural network may be combined with a model predictive control (MPC) and the whole-body dynamics model to construct the motion controller. A MPC method is used to predict a future state and optimize a control strategy, and the whole-body dynamics model provides an accurate description of motion of the dexterous hand. By optimizing algorithms (such as a gradient descent algorithm or a genetic algorithm), an optimal control strategy is solved to achieve precise motion control. At the same time, fast learning and an adaptive capability of the cerebellar model are used to adjust and optimize the control strategy online to adapt to changes in different environments and task requirements.

In some embodiments, there are various manners to combine the cerebellar model neural network with the whole-body dynamics model based on the model predictive control algorithm. In a possible implementation, in order to improve computational accuracy, two models may be combined in parallel. Specifically, combining, based on the model predictive control algorithm, the cerebellar model neural network with the whole-body dynamics model to obtain the motion controller includes: connecting an inverse kinematics module with an inverse dynamics module in series, and then connecting with the cerebellar model neural network in parallel to obtain the motion controller, where the inverse dynamics module is further used to be connected with a forward dynamics module and a forward kinematics module in series sequentially, the forward dynamics module is used to provide a feedback output to the inverse dynamics module, and the forward kinematics module is used to provide a feedback output to the inverse kinematics module and the cerebellar model neural network. In this embodiment, by combining the cerebellar model neural network with the whole-body dynamics model in parallel, information about an actual motion state (for example, a joint angle, and an end effector position, etc.) output by the forward kinematics module is fed back to the cerebellar model neural network, so that the cerebellar model neural network may adjust its internal weights and parameters to correct the motion trajectory and adapt to dynamic characteristics, etc., thereby more accurately predicting and generating a control signal, improving control accuracy, enhancing robustness, optimizing a motion planning. And by adopting a parallel combination manner, the cerebellar model and an inverse dynamics output are combined to improve accuracy.

In another possible implementation, in order to improve computational efficiency, the two models may be combined in series. Specifically, combining, based on the model predictive control algorithm, the cerebellar model neural network with the whole-body dynamics model to obtain the motion controller includes: connecting the cerebellar model neural network with the forward dynamic module and forward kinematics module in series sequentially to obtain the motion controller, where the forward kinematics module is used to provide a feedback output to the cerebellar model neural network. In this embodiment, by combining the cerebellar model neural network with the whole-body dynamics model in series, the information about the actual motion state (for example, the joint angle, and the end effector position, etc.) output by the forward kinematics module is fed back to the cerebellar model neural network, so that the cerebellar model neural network may adjust its internal weights and parameters to correct the motion trajectory and adapt to the dynamic characteristics, etc., thereby more accurately predicting and generating the control signal, improving the control accuracy, enhancing the robustness, optimizing the motion planning. And by adopting a series connection manner, a model structure can be simplified, and computational efficiency can be improved.

Figure 6:
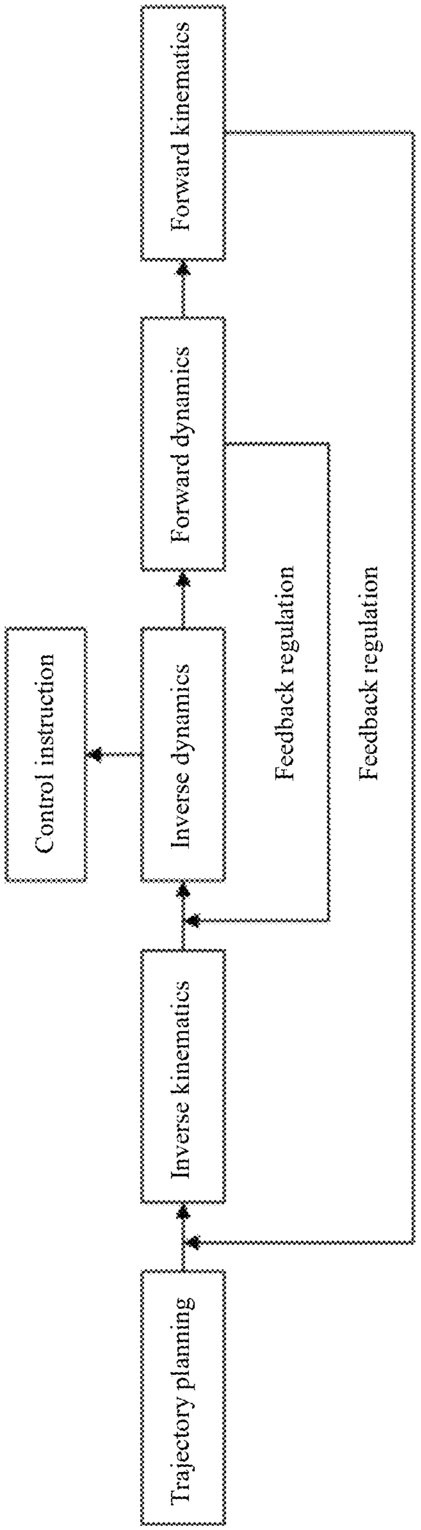
FIG. 6 is a schematic structural diagram of a model predictive control based on a whole-body dynamics model provided by an embodiment of the present disclosure.

Exemplary, as shown in FIG. 6, a model predictive control algorithm based on whole-body dynamics solves a control instruction through inverse kinematics and dynamics, and regulates the control instruction through forward kinematics and dynamics feedback to maintain consistency with an expected trajectory.

Figure 7:
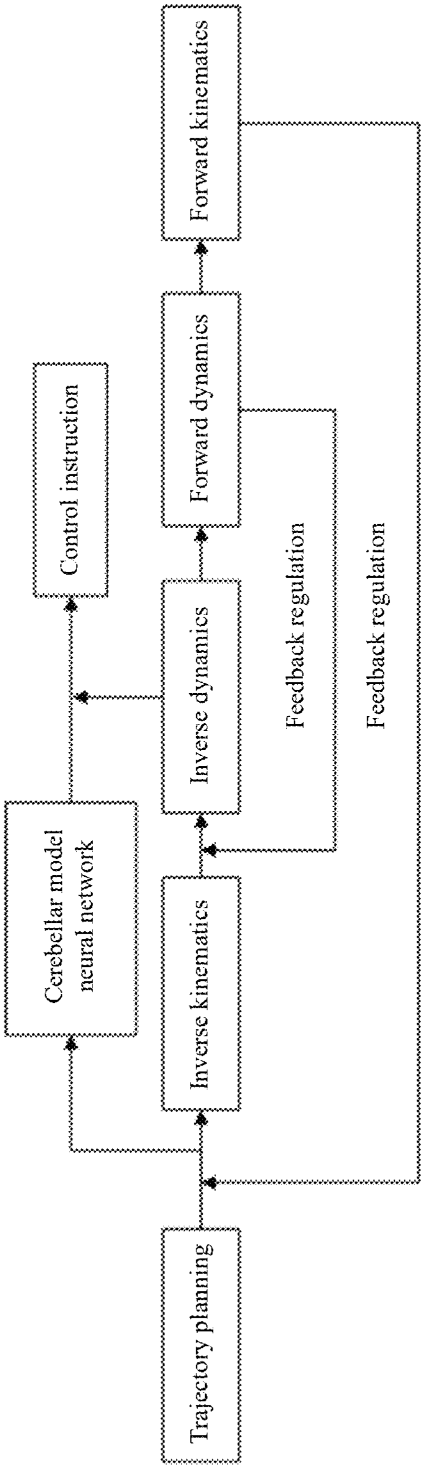
FIG. 7 is a first schematic structural diagram of a cerebellar model provided by an embodiment of the present disclosure.
Figure 8:
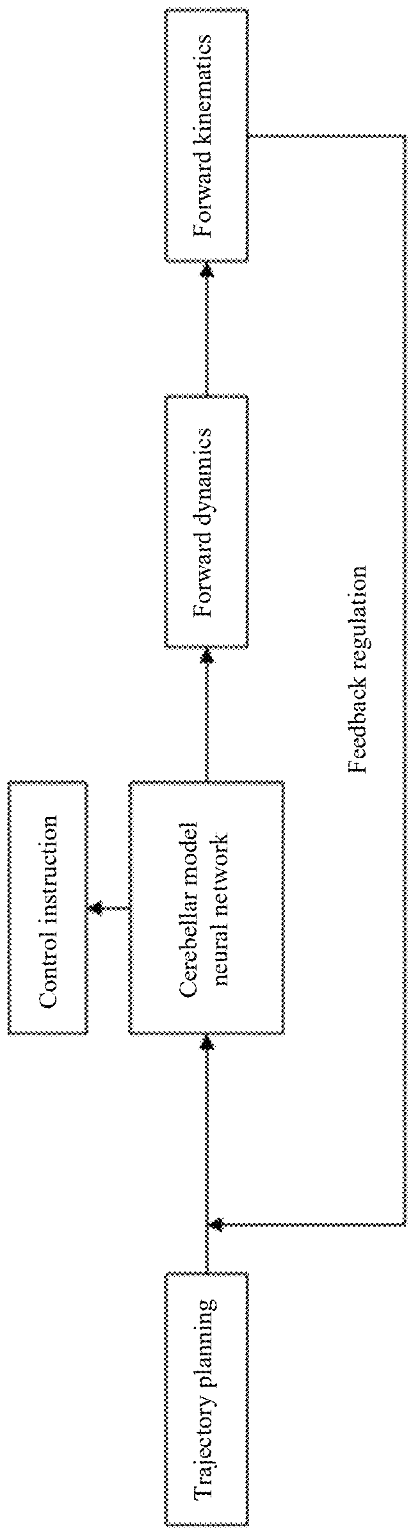
FIG. 8 is a second schematic structural diagram of a cerebellar model provided by an embodiment of the present disclosure.

Exemplary, as shown in FIG. 7 and FIG. 8, by combining a cerebellar model with MPC based on whole-body dynamics, accuracy of control can be improved.

As shown in FIG. 7, a cerebellar model neural network may be connected in parallel with the MPC based on the whole-body dynamics. Specifically, while generating a control instruction according to a predicted trajectory output by a trajectory planning model through the cerebellar model neural network, a control instruction may be generated through an inverse kinematics module and an inverse dynamics module, and the two control instructions may be fused to obtain a final control instruction. At the same time, a feedback regulation based on forward dynamics and forward kinematics may further improve accuracy of the control instruction.

As shown in FIG. 8, a cerebellar model neural network may be connected in series with the MPC based on the whole-body dynamics. Specifically, after a control instruction may be generated according to a predicted trajectory output by a trajectory planning model through the cerebellar model neural network, accuracy of the control instruction may be further improved through a feedback regulation of forward dynamics and forward kinematics.

Figure 9:
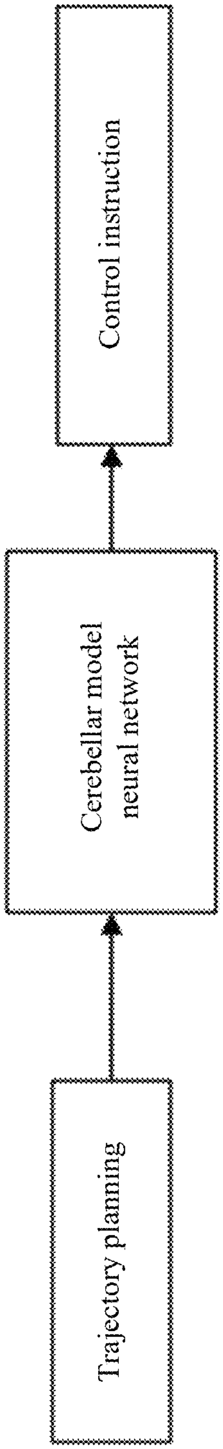
FIG. 9 is a third schematic structural diagram of a cerebellar model provided by an embodiment of the present disclosure.

In some embodiments, as shown in FIG. 9, in order to simplify a model and improve computational efficiency, a cerebellar model neural network may also be used as a motion controller, and then a cerebellar model may be constructed based on a trajectory planning model and a cerebellar model neural network. A predicted trajectory output by the trajectory planning model is processed by the cerebellar model neural network to obtain a control instruction.

A training method of a cerebellar model provided in this embodiment, by combining a cerebellar model neural network with a MPC based on whole-body dynamics model to obtain a motion controller, and the cerebellar model is obtained based on the motion controller and a trajectory planning model, so as to achieve a introducing of a cerebellar mechanism into a dexterous hand control, which can improve flexibility and accuracy of control, enabling the dexterous hand to perform various complex tasks more accurately, helping the dexterous hand quickly adapt to different operating environments and task requirements, reducing dependence on an accurate mathematical model, and thus simplifying a design and an implementation of a control system.

Figure 10:
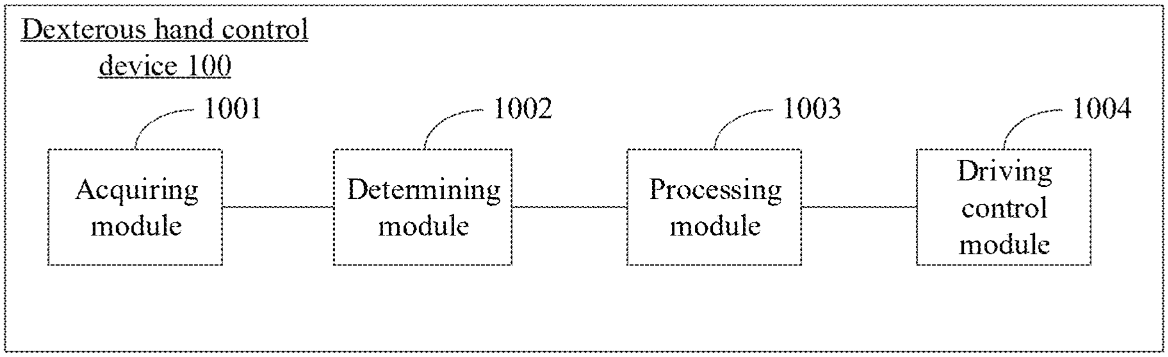
FIG. 10 is a schematic structural diagram of a dexterous hand control device provided by an embodiment of the present disclosure.

FIG. 10 is a schematic structural diagram of a dexterous hand control device provided by an embodiment of the present disclosure. As shown in FIG. 10, the dexterous hand control device 100 includes: an acquiring module 1001, a determining module 1002, a processing module 1003, and a driving control module 1004;

- the acquiring module 1001 is configured to acquire sensor data;
- the determining module 1002 is configured to preprocess the sensor data to obtain input information, where the input information includes environmental information and state information of the dexterous hand;
- the processing module 1003 is configured to input the input information into a cerebellar model to obtain a corresponding control instruction, where the cerebellar model includes a trajectory planning model and a motion controller, the trajectory planning model is used to output a corresponding trajectory planning result according to the input information, the motion controller is used to convert the trajectory planning result into the corresponding control instruction, and the motion controller is obtained by combining a cerebellar model neural network with a whole-body dynamics model based on a model predictive control algorithm; and
- the driving control module 1004 is configured to perform a driving control on an actuator module of the dexterous hand according to the control instruction.

A dexterous hand control device provided in an embodiment of the present disclosure can perceive changes of an external environment and complexity of an operational task in real time, by simulating efficient learning and an adaptive capability of a cerebellum, and dynamically adjust and optimize a control strategy accordingly. This ability significantly improves adaptability and flexibility of a dexterous hand in a complex and changing environment, enabling the dexterous hand to flexibly respond to various challenges. By introducing a cerebellar learning framework, a system can more accurately match an operating environment and a task requirement. Not only does it improve operational accuracy of the dexterous hand, but it also significantly enhances its grasping stability, ensuring successful completion of the operation task. In addition, a rapid response capability of a cerebellar learning mechanism enables the system to quickly process and make a decision upon receiving sensor data, and to generate a control instruction. The rapid response capability is particularly important for a task that requires an urgent adjustment or deals with an unexpected situation, which can significantly improve overall operational efficiency.

In some embodiments, the environmental information includes at least one of following parameters of an object in a real environment where the dexterous hand is located: a position, a shape, or a size; and the state information includes at least one of following parameters: positions, forces, velocities, or accelerations of fingers of the dexterous hand.

In some embodiments, the device 100 further includes a training module (not shown), configured to: construct a physical model according to a physical structure of the dexterous hand and a physical structure of a robotic arm; construct a cerebellar to-be-trained neural network and a trajectory planning to-be-trained model; acquire a training sample set; train, based on the training sample set and the physical model, the cerebellar to-be-trained neural network and the trajectory planning to-be-trained model to obtain the cerebellar model neural network and the trajectory planning model; and combine, based on the model predictive control algorithm, the cerebellar model neural network with the whole-body dynamics model to obtain the motion controller, and determine the cerebellar model according to the motion controller and the trajectory planning model.

In some embodiments, the training module is specifically configured to: connect an inverse kinematics module with an inverse dynamics module in series, and then connect with the cerebellar model neural network in parallel to obtain the motion controller, where the inverse dynamics module is further used to be connected with a forward dynamics module and a forward kinematics module in series sequentially, the forward dynamics module is used to provide a feedback output to the inverse dynamics module, and the forward kinematics module is used to provide a feedback output to the inverse kinematics module and the cerebellar model neural network.

In some embodiments, the training module is specifically configured to: connect the cerebellar model neural network with the forward dynamic module and forward kinematics module in series sequentially to obtain the motion controller, where the forward kinematics module is used to provide a feedback output to the cerebellar model neural network.

In some embodiments, a backbone network of the trajectory planning to-be-trained model includes a convolutional neural network and an attention network, where the convolutional neural network is a residual network, the attention network includes a self-attention network with a first preset number of layers and a cross-attention network with a second preset number of layers, the first preset number of layers is greater than or equal to 4, and the second preset number of layers is greater than or equal to 7.

In some embodiments, the training module is specifically configured to: control the dexterous hand and a robotic arm to perform grasping and operation task in multiple scenarios through a remote operating system, and collect sensor data in a process of task execution, where task objects or operating environments are different in different scenarios, and different task objects refer that at least one of following parameters of the task objects are different: a shape, a material, or a position; and preprocess the sensor data to obtain the training sample set.

In some embodiments, the training sample set includes multiple groups of image sequences and corresponding expected trajectories, as well as multiple groups of trajectories and corresponding expected torques; the training module is specifically configured to: train, based on a first loss function and a backpropagation algorithm, the cerebellar to-be-trained neural network according to the multiple groups of trajectories and the corresponding expected torques to obtain the cerebellar model neural network, where the first loss function includes an error between an actual torque output by the cerebellar to-be-trained neural network and an expected torque; and train, based on a second loss function and a backpropagation algorithm, the trajectory planning to-be-trained model according to the multiple groups of image sequences and the corresponding expected trajectories to obtain the trajectory planning model, where the second loss function includes an error between an actual trajectory output by the trajectory planning to-be-trained model and an expected trajectory.

In some embodiments, the training sample set includes multiple groups of trajectories and corresponding expected torques, as well as multiple groups of image sequences and corresponding expected torques; the training module is specifically configured to: train, based on a first loss function and a backpropagation algorithm, the cerebellar to-be-trained neural network according to the multiple groups of trajectories and the corresponding expected torques to obtain an initial cerebellar model neural network, where the first loss function includes an error between an actual torque output by the cerebellar to-be-trained neural network and an expected torque; and jointly train, based on a second loss function and a backpropagation algorithm, the trajectory planning to-be-trained model and the initial cerebellar model neural network according to the multiple groups of image sequences and the corresponding expected trajectories to obtain the trajectory planning model and the cerebellar model neural network, where the second loss function includes an error between an actual trajectory output by the trajectory planning to-be-trained model and an expected trajectory.

The dexterous hand control device provided in an embodiment of the present disclosure may be used to execute the above method embodiments, and its implementation principle and technical effect are similar, which are not repeated in this embodiment.

Figure 11:
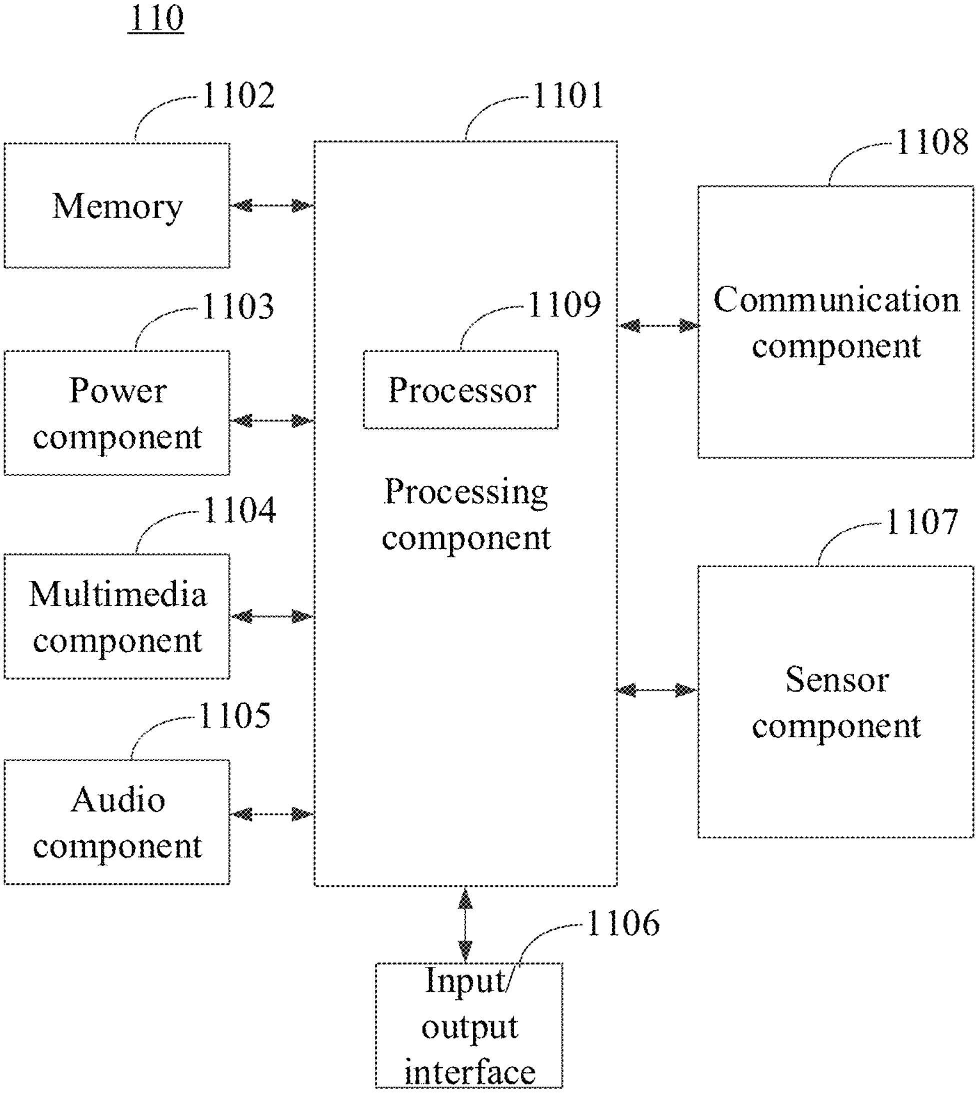
FIG. 11 is a schematic diagram of a hardware structure of a dexterous hand control device provided by an embodiment of the present disclosure.

FIG. 11 is a schematic diagram of a hardware structure of a dexterous hand control device provided by an embodiment of the present disclosure.

A device 110 may include one or more of the following components: a processing component 1101, a memory 1102, a power component 1103, a multimedia component 1104, an audio component 1105, an input/output (I/O) interface 1106, a sensor component 1107, and a communication component 1108.

The processing component 1101 typically controls an overall operation of the device 110, for example, an operation associated with display, a phone call, a data communication, a camera operation, and a recording operation. The processing component 1101 may include one or more processors 1109 to execute instructions to complete all or part of steps of the method described above. In addition, the processing component 1101 may include one or more modules to facilitate interaction between the processing component 1101 and other components. For example, the processing component 1101 may include a multimedia module to facilitate interaction between the multimedia component 1104 and the processing component 1101.

The memory 1102 is configured to store various types of data to support operations on the device 110. Examples of the data include instructions for any application or method used to operate on the device 110, contact data, phonebook data, a message, an image, a video, etc. The memory 1102 may be implemented by any type of volatile or non-volatile storage device or combination thereof, for example, a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic or an optical disk.

The power component 1103 provides power to various components of the device 110. The power component 1103 may include a power management system, one or more power sources, and other components associated with generating, managing, and distributing power for the device 110.

The multimedia component 1104 includes a screen that provides an output interface between the device 110 and a user. In some embodiments, the screen may include a liquid crystal display (LCD) and a touch panel (TP). If the screen includes a touch panel, the screen may be implemented as a touch screen to receive an input signal from the user. The touch panel includes one or more touch sensors to sense touch, sliding, and gestures on the touch panel. The touch sensor may not only sense a boundary of touch or a sliding action, but also detect duration and pressure associated with the touch or sliding operation. In some embodiments, the multimedia component 1104 includes a front camera and/or a rear camera. When the device 110 is in an operation mode, for example, a shooting mode or a video mode, the front camera and/or the rear camera may receive external multimedia data. Each front camera and rear camera may be a fixed optical lens system or have focal length and an optical zoom capability.

The audio component 1105 is configured to output and/or input an audio signal. For example, the audio component 1105 includes a microphone (MIC), which is configured to receive an external audio signal when the device 110 is in the operation mode, for example, a call mode, a recording mode, and a voice recognition mode. The received audio signal may be further stored in the memory 1102 or sent via the communication component 1108. In some embodiments, the audio component 1105 also includes a speaker for outputting the audio signal.

The I/O interface 1106 provides an interface between the processing component 1101 and peripheral interface modules, the peripheral interface modules may be keyboards, click wheels, buttons, etc. These buttons may include but are not limited to: a home button, a volume button, a start button, and a lock button.

The sensor component 1107 includes one or more sensors used to provide various aspects of state assessment for the device 110. For example, the sensor component 1107 may detect an open/close state of the device 110, a relative positioning of a component (for example, the component is a display and a keypad of the device 110, and the sensor component 1107 may also detect changes in the position of the device 110 or a component of the device 110), presence or absence of contact between the user and the device 110, orientation or acceleration/deceleration of the device 110, and temperature changes of the device 110. The sensor component 1107 may include a proximity sensor, which is configured to detect presence of nearby objects without any physical contact. The sensor component 1107 may also include a light sensor, such as a complementary metal oxide semiconductor (CMOS) or a charge coupled device (CCD) image sensor, for use in an imaging application. In some embodiments, the sensor component 1107 may also include an acceleration sensor, a gyroscope sensor, a magnetic sensor, a pressure sensor, or a temperature sensor.

The communication component 1108 is configured to facilitate wired or wireless communication between the device 110 and other devices. The device 110 may access a wireless network based on a communication standard, for example, WiFi, 2G or 3G, or a combination thereof. In an exemplary embodiment, the communication component 1108 receives a broadcast signal or broadcast related information from an external broadcast management system via a broadcast channel. In an exemplary embodiment, the communication component 1108 further includes a near field communication (NFC) module to facilitate a short-range communication. For example, the NFC module may be implemented based on a radio frequency identification (RFID) technology, an infrared data association (IrDA) technology, an ultra wideband (UWB) technology, a Bluetooth (BT) technology, and other technologies.

In an exemplary embodiment, the device 110 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components for executing the methods described above.

An embodiment of the present disclosure further provides an agent, including a dexterous hand, an arm, a sensor, an actuator, and a dexterous hand control device as described in the above embodiments.

In an exemplary embodiment, a non-transitory computer readable storage medium including instructions is also provided, such as a memory 1102 including instructions, which may be executed by a processor 1109 of a device 110 to complete the above method. For example, the non-transitory computer readable storage medium may be a read only memory (ROM), a random access memory (RAM), a compact disc read only memory (CD-ROM), a magnetic tape, a floppy disk, and an optical data storage device, etc.

The above computer readable storage medium may be implemented by any type of volatile or non-volatile storage device or combination thereof, such as a static random access memory (SRAM), an electrically erasable programmable read only memory (EEPROM), an erasable programmable read only memory (EPROM), a programmable read only memory (PROM), a ROM, a magnetic storage, a flash memory, a magnetic disk or a optical disk. The readable storage medium may be any available medium that may be accessed by a general-purpose or special-purpose computer.

An exemplary readable storage medium is coupled to a processor, enabling the processor to read information from and write information to the readable storage medium. Certainly, the readable storage medium may also be a component of the processor. The processor and the readable storage medium may be located in an ASIC. Certainly, the processor and the readable storage medium may also exist as a separate component in the device.

Those of ordinary skill in the art may understand that all or part of steps to implement the above method embodiments may be completed through hardware related to program instructions. The aforementioned program may be stored in a computer readable storage medium. When the program is executed, steps including the above method embodiments are executed; and the aforementioned storage medium includes various a medium, for example, a ROM, a RAM, a magnetic disk, or an optical disk, etc., which may store program codes.

An embodiment of the present disclosure further provides a computer program product, including computer programs that, when executed by a processor, implement the dexterous hand control method executed by the dexterous hand control device as described above.

Finally, it should be noted that the above embodiments are only used to illustrate the technical solution in the present disclosure and not to limit it. Although the present disclosure has been described in detail with reference to the aforementioned embodiments, those skilled in the art should understand that they may still modify the technical solutions described in the aforementioned embodiments, or equivalently replace some or all of technical features in the aforementioned embodiments, and these modifications or substitutions do not cause the essence of the corresponding technical solution to deviate from the scope of the technical solutions of the various embodiments in the present disclosure.

The invention claimed is:

1. A dexterous hand control method, comprising:

combining, based on a model predictive control algorithm, a cerebellar model neural network with a whole-body dynamics model to obtain a motion controller, and determining the cerebellar model according to the motion controller and a trajectory planning model, wherein the cerebellar model is used to introduce a cerebellar mechanism into the dexterous hand control;

wherein combining, based on the model predictive control algorithm, the cerebellar model neural network with the whole-body dynamics model to obtain the motion controller, and determining the cerebellar model according to the motion controller and the trajectory planning model, comprises:

connecting an inverse kinematics module with an inverse dynamics module in series, and then connecting with the cerebellar model neural network in parallel to obtain the motion controller, wherein the inverse dynamics module is further used to be connected with a forward dynamics module and a forward kinematics module in series sequentially, the forward dynamics module is used to provide a feedback output to the inverse dynamics module, and the forward kinematics module is used to provide a feedback output to the inverse kinematics module and the cerebellar model neural network;

acquiring sensor data;

preprocessing the sensor data to obtain input information, wherein the input information comprises environmental information and state information of a dexterous hand; wherein the environmental information comprises information of an operating environment and at least one of following parameters of an object in the operating environment: a position, a shape, or a size;

inputting the input information into the cerebellar model to obtain a corresponding control instruction, wherein the cerebellar model comprises the trajectory planning model and the motion controller, the trajectory planning model is used to output a corresponding trajectory planning result according to the input information, the motion controller is used to convert the trajectory planning result into the corresponding control instruction; and the motion controller is obtained by combining a cerebellar model neural network with a whole-body dynamics model based on a model predictive control algorithm; and performing a driving control on an actuator module of the dexterous hand according to the control instruction;

wherein inputting the input information into the cerebellar model to obtain a corresponding control instruction comprises:

generating a first control instruction according to a predicted trajectory output by the trajectory planning model through the cerebellar model neural network;

generating a second control instruction through the inverse kinematics module and the inverse dynamics module;

fusing the first control instruction and the second control instruction to obtain the control instruction;

wherein the control instruction is further regulated through the feedback output of the forward dynamics module and the forward kinematics module.

2. The method according to claim 1, wherein the state information comprises at least one of following parameters: positions, forces, velocities, or accelerations of fingers of the dexterous hand; and before combining, based on the model predictive control algorithm, the cerebellar model neural network with the whole-body dynamics model to obtain the motion controller, and determining the cerebellar model according to the motion controller and the trajectory planning model, the method further comprises:

constructing a physical model according to a physical structure of the dexterous hand and a physical structure of a robotic arm;

constructing a cerebellar to-be-trained neural network and a trajectory planning to-be-trained model; wherein a backbone network of the trajectory planning to-be-trained model comprises a convolutional neural network and an attention network, the convolutional neural network is a residual network, the attention network comprises a self-attention network with a first preset number of layers and a cross-attention network with a second preset number of layers, the first preset number of layers is greater than or equal to 4, and the second preset number of layers is greater than or equal to 7;

acquiring a training sample set; and training, based on the training sample set and the physical model, the cerebellar to-be-trained neural network and the trajectory planning to-be-trained model to obtain the cerebellar model neural network and the trajectory planning model.

3. The method according to claim 2, wherein acquiring the training sample set comprises:

controlling the dexterous hand and a robotic arm to perform grasping and operation task in multiple scenarios through a remote operating system, and collecting sensor data in a process of task execution, wherein task objects or operating environments are different in different scenarios, and different task objects refer that at least one of following parameters of the task objects are different: a shape, a material, or a position; and preprocessing the sensor data to obtain the training sample set.

4. The method according to claim 2, wherein the training sample set comprises multiple groups of image sequences and corresponding expected trajectories, as well as multiple groups of trajectories and corresponding expected torques; and training, based on the training sample set and the physical model, the cerebellar to-be-trained neural network and the trajectory planning to-be-trained model to obtain the cerebellar model neural network and the trajectory planning model comprises:

training, based on a first loss function and a backpropagation algorithm, the cerebellar to-be-trained neural network according to the multiple groups of trajectories and the corresponding expected torques to obtain the cerebellar model neural network, wherein the first loss function comprises an error between an actual torque output by the cerebellar to-be-trained neural network and an expected torque; and training, based on a second loss function and a backpropagation algorithm, the trajectory planning to-be-trained model according to the multiple groups of image sequences and the corresponding expected trajectories to obtain the trajectory planning model, wherein the second loss function comprises an error between an actual trajectory output by the trajectory planning to-be-trained model and an expected trajectory.

5. The method according to claim 2, wherein the training sample set comprises multiple groups of trajectories and corresponding expected torques, as well as multiple groups of image sequences and corresponding expected torques; and training, based on the training sample set and the physical model, the cerebellar to-be-trained neural network and the trajectory planning to-be-trained model to obtain the cerebellar model neural network and the trajectory planning model comprises:

training, based on a first loss function and a backpropagation algorithm, the cerebellar to-be-trained neural network according to the multiple groups of trajectories and the corresponding expected torques to obtain an initial cerebellar model neural network, wherein the first loss function comprises an error between an actual torque output by the cerebellar to-be-trained neural network and an expected torque; and jointly training, based on a second loss function and a backpropagation algorithm, the trajectory planning to-be-trained model and the initial cerebellar model neural network according to the multiple groups of image sequences and the corresponding expected trajectories to obtain the trajectory planning model and the cerebellar model neural network, wherein the second loss function comprises an error between an actual trajectory output by the trajectory planning to-be-trained model and an expected trajectory.

6. The method according to claim 2, wherein the cerebellar to-be-trained neural network comprises a virtual associative space (AC) and a physical storage space (AP), and a conceptual mapping and an actual mapping of the AC and the AP are used to achieve nonlinear mapping based on a local approximation and an association function.

7. The method according to claim 2, wherein the cerebellar model is initially trained firstly, and then an initial cerebellar model neural network and the trajectory planning to-be-trained model are jointly trained after the initial training.

8. The method according to claim 1, wherein the trajectory planning to-be-trained model adopts an imitation learning method to extract a plurality of trajectory features from operation data of human or other dexterous hands, and the plurality of trajectory features are encoded and decoded based on a convolutional neural network (CNN) and a sequence model Transformer based on attention to generate a plurality of trajectories for different tasks, wherein the CNN is used to extract spatial features of trajectories, and the Transformer is used to capture temporal dependencies of trajectories.

9. The method according to claim 1, wherein the whole-body dynamics model provides an accurate description of motion of the dexterous hand, and a gradient descent algorithm or a genetic algorithm is used to solve an optimal control strategy to achieve a precise motion control.

10. A dexterous hand control device, comprising: at least one processor and a memory;

the memory stores computer execution instructions; and the at least one processor executes computer execution instructions stored in the memory to cause the at least one processor to execute the following:

combining, based on a model predictive control algorithm, a cerebellar model neural network with a whole-body dynamics model to obtain a motion controller, and determining the cerebellar model according to the motion controller and a trajectory planning model, wherein the cerebellar model is used to introduce a cerebellar mechanism into the dexterous hand control;

wherein combining, based on the model predictive control algorithm, the cerebellar model neural network with the whole-body dynamics model to obtain the motion controller, and determining the cerebellar model according to the motion controller and the trajectory planning model, comprises:

connecting an inverse kinematics module with an inverse dynamics module in series, and then connecting with the cerebellar model neural network in parallel to obtain the motion controller, wherein the inverse dynamics module is further used to be connected with a forward dynamics module and a forward kinematics module in series sequentially, the forward dynamics module is used to provide a feedback output to the inverse dynamics module, and the forward kinematics module is used to provide a feedback output to the inverse kinematics module and the cerebellar model neural network;

acquiring sensor data;

preprocessing the sensor data to obtain input information, wherein the input information comprises environmental information and state information of a dexterous hand; wherein the environmental information comprises information of an operating environment and at least one of following parameters of an object in the operating environment: a position, a shape, or a size;

inputting the input information into the cerebellar model to obtain a corresponding control instruction, wherein the cerebellar model comprises the trajectory planning model and the motion controller, the trajectory planning model is used to output a corresponding trajectory planning result according to the input information, the motion controller is used to convert the trajectory planning result into the corresponding control instruction; and the motion controller is obtained by combining a cerebellar model neural network with a whole-body dynamics model based on a model predictive control algorithm; and performing a driving control on an actuator module of the dexterous hand according to the control instruction;

wherein inputting the input information into the cerebellar model to obtain a corresponding control instruction comprises:

generating a first control instruction according to a predicted trajectory output by the trajectory planning model through the cerebellar model neural network;

generating a second control instruction through the inverse kinematics module and the inverse dynamics module;

fusing the first control instruction and the second control instruction to obtain the control instruction;

wherein the control instruction is further regulated through the feedback output of the forward dynamics module and the forward kinematics module.

11. The device according to claim 10, wherein the state information comprises at least one of following parameters: positions, forces, velocities, or accelerations of fingers of the dexterous hand;

wherein before combining, based on the model predictive control algorithm, the cerebellar model neural network with the whole-body dynamics model to obtain the motion controller, and determining the cerebellar model according to the motion controller and the trajectory planning model, the at least one processor executes computer execution instructions stored in the memory to further cause the at least one processor to execute the following:

constructing a physical model according to a physical structure of the dexterous hand and a physical structure of a robotic arm;

constructing a cerebellar to-be-trained neural network and a trajectory planning to-be-trained model; wherein a backbone network of the trajectory planning to-be-trained model comprises a convolutional neural network and an attention network, the convolutional neural network is a residual network, the attention network comprises a self-attention network with a first preset number of layers and a cross-attention network with a second preset number of layers, the first preset number of layers is greater than or equal to 4, and the second preset number of layers is greater than or equal to 7;

acquiring a training sample set; and training, based on the training sample set and the physical model, the cerebellar to-be-trained neural network and the trajectory planning to-be-trained model to obtain the cerebellar model neural network and the trajectory planning model.

12. The device according to claim 11, wherein the at least one processor executes computer execution instructions stored in the memory to further cause the at least one processor to execute the following:

controlling the dexterous hand and a robotic arm to perform grasping and operation task in multiple scenarios through a remote operating system, and collecting sensor data in a process of task execution, wherein task objects or operating environments are different in different scenarios, and different task objects refer that at least one of following parameters of the task objects are different: a shape, a material, or a position; and preprocessing the sensor data to obtain the training sample set.

13. The device according to claim 11, wherein the training sample set comprises multiple groups of image sequences and corresponding expected trajectories, as well as multiple groups of trajectories and corresponding expected torques; and the at least one processor executes computer execution instructions stored in the memory to further cause the at least one processor to execute the following:

training, based on a first loss function and a backpropagation algorithm, the cerebellar to-be-trained neural network according to the multiple groups of trajectories and the corresponding expected torques to obtain the cerebellar model neural network, wherein the first loss function comprises an error between an actual torque output by the cerebellar to-be-trained neural network and an expected torque; and training, based on a second loss function and a backpropagation algorithm, the trajectory planning to-be-trained model according to the multiple groups of image sequences and the corresponding expected trajectories to obtain the trajectory planning model, wherein the second loss function comprises an error between an actual trajectory output by the trajectory planning to-be-trained model and an expected trajectory.

14. The device according to claim 11, wherein the training sample set comprises multiple groups of trajectories and corresponding expected torques, as well as multiple groups of image sequences and corresponding expected torques; and the at least one processor executes computer execution instructions stored in the memory further to cause the at least one processor to execute the following:

training, based on a first loss function and a backpropagation algorithm, the cerebellar to-be-trained neural network according to the multiple groups of trajectories and the corresponding expected torques to obtain an initial cerebellar model neural network, wherein the first loss function comprises an error between an actual torque output by the cerebellar to-be-trained neural network and an expected torque; and jointly training, based on a second loss function and a backpropagation algorithm, the trajectory planning to-be-trained model and the initial cerebellar model neural network according to the multiple groups of image sequences and the corresponding expected trajectories to obtain the trajectory planning model and the cerebellar model neural network, wherein the second loss function comprises an error between an actual trajectory output by the trajectory planning to-be-trained model and an expected trajectory.

15. An agent, comprising a dexterous hand, an arm, a sensor, an actuator, and the dexterous hand control device according to claim 10.

16. A non-transitory machine-readable medium, having computer execution instructions stored thereon, wherein when a processor executes the computer execution instructions, the following is implemented:

combining, based on a model predictive control algorithm, a cerebellar model neural network with a whole-body dynamics model to obtain a motion controller, and determining the cerebellar model according to the motion controller and a trajectory planning model, wherein the cerebellar model is used to introduce a cerebellar mechanism into the dexterous hand control;

wherein combining, based on the model predictive control algorithm, the cerebellar model neural network with the whole-body dynamics model to obtain the motion controller, and determining the cerebellar model according to the motion controller and the trajectory planning model, comprises:

connecting an inverse kinematics module with an inverse dynamics module in series, and then connecting with the cerebellar model neural network in parallel to obtain the motion controller, wherein the inverse dynamics module is further used to be connected with a forward dynamics module and a forward kinematics module in series sequentially, the forward dynamics module is used to provide a feedback output to the inverse dynamics module, and the forward kinematics module is used to provide a feedback output to the inverse kinematics module and the cerebellar model neural network;

acquiring sensor data;

preprocessing the sensor data to obtain input information, wherein the input information comprises environmental information and state information of a dexterous hand; wherein the environmental information comprises information of an operating environment and at least one of following parameters of an object in the operating environment: a position, a shape, or a size;

inputting the input information into the cerebellar model to obtain a corresponding control instruction, wherein the cerebellar model comprises the trajectory planning model and the motion controller, the trajectory planning model is used to output a corresponding trajectory planning result according to the input information, the motion controller is used to convert the trajectory planning result into the corresponding control instruction; and the motion controller is obtained by combining a cerebellar model neural network with a whole-body dynamics model based on a model predictive control algorithm; and performing a driving control on an actuator module of the dexterous hand according to the control instruction;

wherein inputting the input information into the cerebellar model to obtain a corresponding control instruction comprises:

generating a first control instruction according to a predicted trajectory output by the trajectory planning model through the cerebellar model neural network;

generating a second control instruction through the inverse kinematics module and the inverse dynamics module;

fusing the first control instruction and the second control instruction to obtain the control instruction;

wherein the control instruction is further regulated through the feedback output of the forward dynamics module and the forward kinematics module.

17. The non-transitory machine-readable medium according to claim 16, wherein the state information comprises at least one of following parameters: positions, forces, velocities, or accelerations of fingers of the dexterous hand;

wherein when the processor executes the computer execution instructions, before combining, based on the model predictive control algorithm, the cerebellar model neural network with the whole-body dynamics model to obtain the motion controller, and determining the cerebellar model according to the motion controller and the trajectory planning model, the computer execution instructions stored in the memory are implemented to cause at least one processor to further implement the following:

constructing a physical model according to a physical structure of the dexterous hand and a physical structure of a robotic arm;

constructing a cerebellar to-be-trained neural network and a trajectory planning to-be-trained model; wherein a backbone network of the trajectory planning to-be-trained model comprises a convolutional neural network and an attention network, the convolutional neural network is a residual network, the attention network comprises a self-attention network with a first preset number of layers and a cross-attention network with a second preset number of layers, the first preset number of layers is greater than or equal to 4, and the second preset number of layers is greater than or equal to 7;

acquiring a training sample set; and training, based on the training sample set and the physical model, the cerebellar to-be-trained neural network and the trajectory planning to-be-trained model to obtain the cerebellar model neural network and the trajectory planning model.

18. The non-transitory machine-readable medium according to claim 17, wherein when the processor executes the computer execution instructions, the following is further implemented:

controlling the dexterous hand and a robotic arm to perform grasping and operation task in multiple scenarios through a remote operating system, and collecting sensor data in a process of task execution, wherein task objects or operating environments are different in different scenarios, and different task objects refer that at least one of following parameters of the task objects are different: a shape, a material, or a position; and preprocessing the sensor data to obtain the training sample set.

19. The non-transitory machine-readable medium according to claim 17, wherein the training sample set comprises multiple groups of image sequences and corresponding expected trajectories, as well as multiple groups of trajectories and corresponding expected torques; and when the processor executes the computer execution instructions, the following is further implemented:

training, based on a first loss function and a backpropagation algorithm, the cerebellar to-be-trained neural network according to the multiple groups of trajectories and the corresponding expected torques to obtain the cerebellar model neural network, wherein the first loss function comprises an error between an actual torque output by the cerebellar to-be-trained neural network and an expected torque; and training, based on a second loss function and a backpropagation algorithm, the trajectory planning to-be-trained model according to the multiple groups of image sequences and the corresponding expected trajectories to obtain the trajectory planning model, wherein the second loss function comprises an error between an actual trajectory output by the trajectory planning to-be-trained model and an expected trajectory.

20. The non-transitory machine-readable medium according to claim 17, wherein the training sample set comprises multiple groups of trajectories and corresponding expected torques, as well as multiple groups of image sequences and corresponding expected torques; and when the processor executes the computer execution instructions, the following is further implemented:

training, based on a first loss function and a backpropagation algorithm, the cerebellar to-be-trained neural network according to the multiple groups of trajectories and the corresponding expected torques to obtain an initial cerebellar model neural network, wherein the first loss function comprises an error between an actual torque output by the cerebellar to-be-trained neural network and an expected torque; and jointly training, based on a second loss function and a backpropagation algorithm, the trajectory planning to-be-trained model and the initial cerebellar model neural network according to the multiple groups of image sequences and the corresponding expected trajectories to obtain the trajectory planning model and the cerebellar model neural network, wherein the second loss function comprises an error between an actual trajectory output by the trajectory planning to-be-trained model and an expected trajectory.

* * * * *